(12) United States Patent
Liu

(10) Patent No.: US 7,508,889 B2
(45) Date of Patent: Mar. 24, 2009

(54) DIGITAL APPARATUS FOR SOFT DETECTION OF MULTI-CHIP DBPSK SIGNALS

(75) Inventor: Xiang Liu, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 625 days.

(21) Appl. No.: 11/164,222

(22) Filed: Nov. 15, 2005

(65) Prior Publication Data

US 2007/0110190 A1     May 17, 2007

(51) Int. Cl.
*H03D 3/22*      (2006.01)
*H04L 27/22*      (2006.01)

(52) U.S. Cl. .................. 375/330; 375/283; 329/309; 329/310

(58) Field of Classification Search .................. 375/283, 375/330; 329/304–310
See application file for complete search history.

(56) References Cited

U.S. PATENT DOCUMENTS

| 4,715,047 A | * | 12/1987 | Hambley | ............. | 375/330 |
| 4,984,247 A | * | 1/1991 | Kaufmann et al. | ............. | 375/141 |
| 5,786,725 A | | 7/1998 | Boccuzzi et al. | | |
| 6,393,599 B1 | * | 5/2002 | Chan | ............. | 714/797 |

FOREIGN PATENT DOCUMENTS

WO    WO 2005/107107 A2    11/2005

OTHER PUBLICATIONS

D. Divsalar, et al., "Multiple-symbol differential detection of MPSK," IEEE Trans. Commun., vol. COM-38, No. 3, pp. 300-308, Mar. 1990.
J. P. Gordon et al., "Phase noise in photonic communications systems using linear amplifiers," Opt. Lett., vol. 15, pp. 1351-1353, 1990.
M. Nazarathy et al., "Multichip differential phase encoded optical transmission," IEEE Photon. Technol. Lett., vol. 17, No. 5, pp. 1133-1135, May 2005.
Y. Yadin et al., "Soft detection of multichip DPSK over the nonlinear fiber-optic channel," IEEE Photon. Technol. Lett., vol. 17, No. 9, pp. 2001-2003, Sep. 2005.

* cited by examiner

*Primary Examiner*—Curtis B Odom

(57) ABSTRACT

A system for implementing the soft decision of a 3-chip differential binary phase shift keying (DBPSK) optical signal using digital components. Pair-wise comparisons of three differentially detected signals are performed and analyzed by digital logic which determines the most likely sequence of data. In a first variant, pairs of adjacent data bits are detected simultaneously, whereas in a second variant, data bits are detected individually. The digital logic can be implemented using conventional logic gates.

21 Claims, 3 Drawing Sheets

DIGITAL APPARATUS FOR SOFT DETECTION OF MULTI-CHIP DBPSK SIGNALS

FIELD OF THE INVENTION

The present invention relates to the field of high-speed optical data communications, and in particular, to the detection of modulated optical signals.

BACKGROUND INFORMATION

Optical differential phase-shift keying (DPSK) has become an attractive modulation format that offers high receiver sensitivity and high tolerance to some fiber nonlinear effects such as cross-phase modulation and four-wave mixing. Several record-setting, long-haul, high-speed ($\geq 10$ Gb/s) optical fiber transmissions have been demonstrated using DPSK.

More recently, a family of optical DPSK referred to as optical Multi-chip DPSK (MC-DPSK) has been introduced. (See, e.g., M. Nazarathy et al., "Multichip differential phase encoded optical transmission," IEEE Photon. Technol. Lett., vol. 17, no. 5, pp. 1133-1135, May 2005, hereinafter "Nazarathy".) MC-DPSK has its origins in wireless communications. (See, e.g., D. Divsalar et al., "Multiple-symbol differential detection of MPSK," IEEE Trans. Commun., vol. COM-38, no. 3, pp. 300-308, March 1990, hereinafter "Divsalar".)

In MC-DPSK, multiple differential detections are performed over a window of multiple consecutive symbol intervals, also referred to as "chips." A soft decision circuit is used to extract the transmitted data based on maximum-likelihood. As the number of chips increases, the performance of MC-DPSK approaches the performance of coherent detection PSK. (See e.g., Y. Yadin et al., "Soft detection of multichip DPSK over the nonlinear fiber-optic channel," IEEE Photon. Technol. Lett., vol. 17, no. 9, pp. 2001-2003, September 2005, hereinafter "Yadin"; and Nazarathy.)

MC detection provides large receiver sensitivity gain for multi-level DPSK signals. (See Nazarathy and Divsalar.) For differential binary phase-shift keying (DBPSK), the MC detection gain is small (<0.5 dB) in the linear regime. (See Yadin.). The MC-DPSK gain can be enhanced in the nonlinear regime where nonlinear phase noise, resulting from the Gordon-Mollenauer effect, becomes the dominating penalty source. (See, J. P. Gordon et al., "Phase noise in photonic communications systems using linear amplifiers," Opt. Lett., vol. 15, pp. 1351-1353, 1990.) Even with 3-chip detection, a sensitivity gain of over 1 dB can be obtained for DPSK.

Yadin describes a soft detection circuit for 3-chip DBPSK, such as that shown in FIG. 1. The circuit 100 comprises a differential detection circuit 110 and a soft decision circuit 120. As shown in FIG. 1, the Yadin soft decision circuit 120 requires several electrical summers ($\Sigma$) with high-speed analog inputs and outputs as well as a selector to select the largest summer output. The summers implement the following set of equations:

$$q_{00} = q_T[k] + q_T[k-1] + q_{2T}[k],$$
$$q_{01} = -q_T[k] + q_T[k-1] - q_{2T}[k],$$
$$q_{10} = q_T[k] - q_T[k-1] - q_{2T}[k],$$
$$q_{11} = -q_T[k] - q_T[k-1] + q_{2T}[k], \quad (1)$$

where $q_T[k]$, $q_T[k-1]$, and $q_{2T}[k]$, are three differentially detected signals based on comparisons between the k-th and (k−1)-th bit pair, the (k−1)-th and (k−2)-th bit pair, and the k-th and (k−2)-th bit pair, respectively. The variables q00-q11, referred to as "decision variables," are indicative of the likelihood of the two-bit sequence represented by their indices. The soft decision circuit 120 determines (using the analog summers) the decision variables q00-q11, selects the largest decision variable, and outputs the two bits corresponding to the largest decision variable. A "hard" detection of DBPSK can be performed based on only the value of $q_T[k]$. Soft detection, however, has been found to provide superior performance.

The analog soft decision circuit such as that described by Yadin has several drawbacks, including the fact that high-speed analog summers are quite technically challenging to make, and are not yet commercially available. In addition, selecting the largest decision variable from the four decision variables entails significant additional circuitry.

SUMMARY OF THE INVENTION

In an exemplary embodiment, the present invention provides a circuit for implementing the soft decision of a 3-chip DBPSK signal by using digital components. The soft decision circuit of the present invention comprises a set of pair-wise comparators, coupled to a selector comprised of digital logic gates, such as AND and NOR gates. The selector generates two output bits based on maximum-likelihood. The output bits are assembled by an appropriate data interleaver to obtain a recovered data stream.

In a further exemplary embodiment, a 3-chip soft decision circuit is provided which generates one output bit at a time. This embodiment can be implemented with fewer elements.

DETAILED DESCRIPTION

Figure 2:
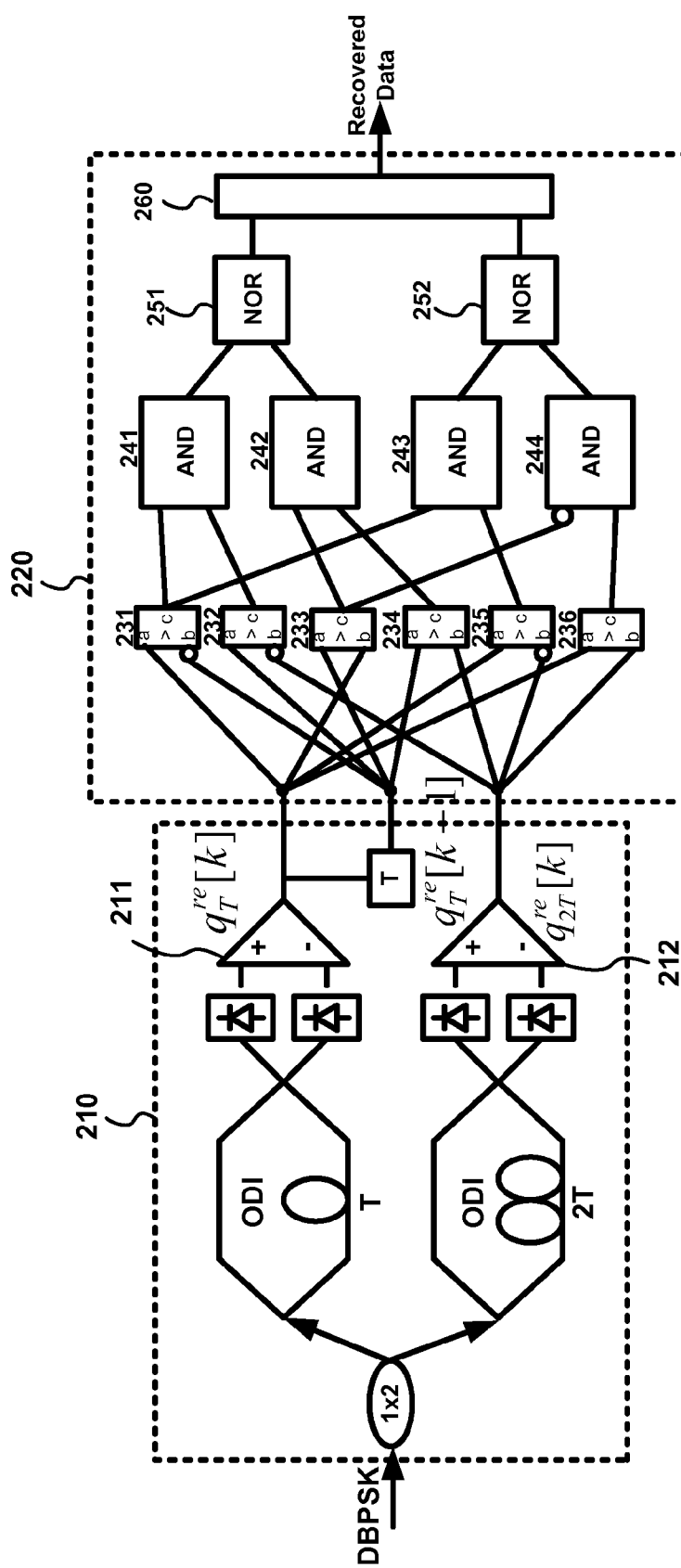
FIG. 2 is a schematic diagram of a first exemplary embodiment of a digital soft detection circuit for 3-chip DBPSK in accordance with the present invention.

An exemplary embodiment of a soft detection circuit 200 in accordance with the present invention is shown schematically in FIG. 2. The soft detection circuit 200 comprises a 3-chip DBPSK detection circuit 210 and a soft decision circuit 220.

Figure 1:
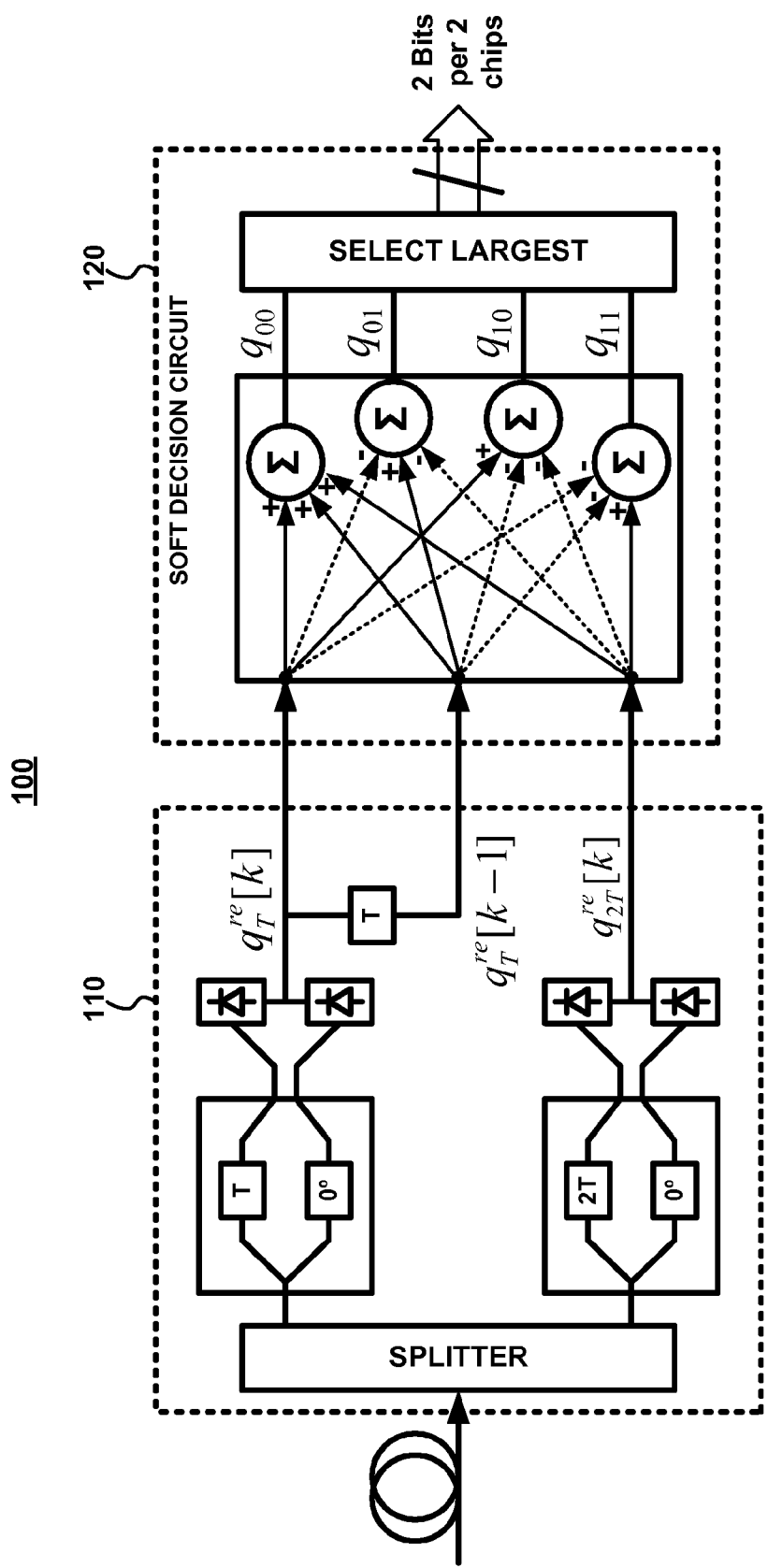
FIG. 1 is a schematic diagram of a conventional analog soft decision circuit for 3-chip DBPSK.

The 3-chip differential detection circuit 210 can be implemented in a conventional manner to generate three signals, $q_T[k]$, $q_T[k-1]$, and $q_{2T}[k]$ from a DBPSK modulated input signal. As in the case of the conventional circuit of FIG. 1, discussed above, $q_T[k]$, $q_T[k-1]$, and $q_{2T}[k]$, are three differentially detected signals based on the comparisons between the k-th and (k−1)-th bit pair, the (k−1)-th and (k−2)-th bit pair, and the k-th and (k−2)-th bit pair, respectively, of the incoming DBPSK optical signal.

In the exemplary embodiment shown, the detection circuit 210 includes differential amplifiers 211 and 212 that generate the three differentially detected signals, $q_T[k]$, $q_T[k-1]$, and $q_{2T}[k]$, with nominally symmetric voltage swings about 0 volts, e.g., +500 mV for a logic "1" and −500 mV for a logic "0". The nominal voltage levels of the signals are preferably generally equal.

The three detected signals are provided to an array of six pair-wise comparators 231-236. As shown in FIG. 2, each comparator 231-236 has a first (a) and a second (b) input and generates a binary output signal (c) based on a comparison of the first and second inputs: e.g., if the voltage level of the first input exceeds the voltage level of the second input (a>b), a binary high signal is generated at the output (e.g., c=1), otherwise a binary low signal is generated at the output (e.g., c=0). For comparators 231, 232 and 235, the second input (b) is inverted (−b) before it is compared to the first input (a). The comparators 231-236 can be implemented in a variety of well-known ways.

In the exemplary decision circuit 220 shown in FIG. 2, the first detected signal, $q_T[k]$, is coupled to the first input of comparator 231, the second input of comparator 233, the first input of comparator 235, and the first input of comparator 236; the second detected signal, $q_T[k-1]$, is coupled to the second, inverted, input of comparator 231, the first input of comparator 232, the first input of comparator 233, and the first input of comparator 234; and the third detected signal, $q_{2T}[k]$, is coupled to the second, inverted, input of comparator 232, the second input of comparator 234, the second, inverted, input of comparator 235, and the second input of comparator 236.

The outputs of the comparators 231-236 are indicative of various conditions of the four decision variables $q_{ij}$ (with $i \in \{0,1\}$ and $j \in \{0,1\}$). As discussed above, each decision variable is associated with a two-bit sequence ij of adjacent input DBPSK signal bits. In the exemplary embodiment, a "0" represents a 0 phase change between two adjacent DBPSK bits, whereas a "1" represents a π phase change between two adjacent DBPSK bits.

As discussed above, the four decision variables $q_{ij}$ are defined by Equation Set 1 as follows:

$$q_{00}=q_T[k]+q_T[k-1]+q_{2T}[k],$$

$$q_{01}=-q_T[k]+q_T[k-1]-q_{2T}[k],$$

$$q_{10}=q_T[k]-q_T[k-1]-q_{2T}[k],$$

$$q_{11}=-q_T[k]-q_T[k-1]+q_{2T}[k] \quad (1)$$

A maximum-likelihood decision law can be applied to the decision variables to arrive at a best guess for each 2-bit data sequence in the original data stream. More specifically, the largest of the four decision variables $q_{ij}$ is indicative of the most likely two-bit sequence ij.

A logic high output (c=1) at the comparator 231 indicates that $q_{00}>q_{11}$; a high output at the comparator 232 indicates that $q_{00}>q_{10}$; a high output at the comparator 233 indicates that $q_{01}>q_{10}$; a high output at the comparator 234 indicates that $q_{01}>q_{11}$; a high output at the comparator 235 indicates that $q_{00}>q_{01}$; and a high output at the comparator 236 indicates that $q_{10}>q_{11}$.

In the exemplary embodiment shown, the outputs of the comparators 231-236 are coupled to logic AND gates 241-244, whose outputs are, in turn, connected to logic NOR gates 251 and 252. The comparators and gates are so coupled that the outputs of the NOR 251, 252 gates are indicative of the values of the bits i and j, respectively, of each two-bit sequence ij of the input data stream. More specifically, the outputs of comparators 231 and 232 are coupled to the inputs of AND gate 241; the outputs of comparators 233 and 234 are coupled to the inputs of AND gate 242; the outputs of comparators 231 and 235 are coupled to the inputs of AND gate 243; and the outputs of comparators 233 and 236 are coupled to an inverting input and a non-inverting input, respectively, of AND gate 244.

Logic high outputs at the AND gates 241, 242, 243 and 244 represent the following conditions, respectively: $q_{00}>\max(q_{10}, q_{11})$, $q_{01}>\max(q_{10}, q_{11})$, $q_{00}>\max(q_{01}, q_{11})$, and $q_{10}>\max(q_{01}, q_{11})$. The outputs of AND gates 241 and 242 are NOR'ed by NOR gate 251 to generate the best guess of the first bit (i), while the outputs of AND gates 243 and 244 are NOR'ed by NOR gate 252 to generate the best guess of the second bit (j).

The best guesses (G1, G2) of a given two-bit sequence can be expressed as:

$$G1=\text{NOR}[\text{AND}(A>-B, B>-C), \text{AND}(B>A, B>C)],$$

$$G2=\text{NOR}[\text{AND}(A>-B, A>-C), \text{AND}(\text{NOT}(B>A), A>C)], \quad (2a)$$

where $A=q_T[k]$, $B=q_T[k-1]$, and $C=q_{2T}[k]$.

In terms of the decision variables $q_{ij}$, the best guesses (G1, G2) can be expressed as follows:

$$G1=\text{NOR}[\text{AND}(q_{00}>q_{11}, q_{00}>q_{10}), \text{AND}(q_{01}>q_{10}, q_{01}>q_{11})],$$

$$G2=\text{NOR}[\text{AND}(q_{00}>q_{11}, q_{00}>q_{01}), \text{AND}(\text{NOT}(q_{01}>q_{10}), q_{10}>q_{11})]. \quad (2b)$$

The bit estimate outputs of the NOR gates 251 and 252 are coupled to an appropriate interleaver 260 (e.g., 2:1 multiplexer) which generates a serial bit stream that recreates the data received in the DBPSK input signal.

Figure 3:
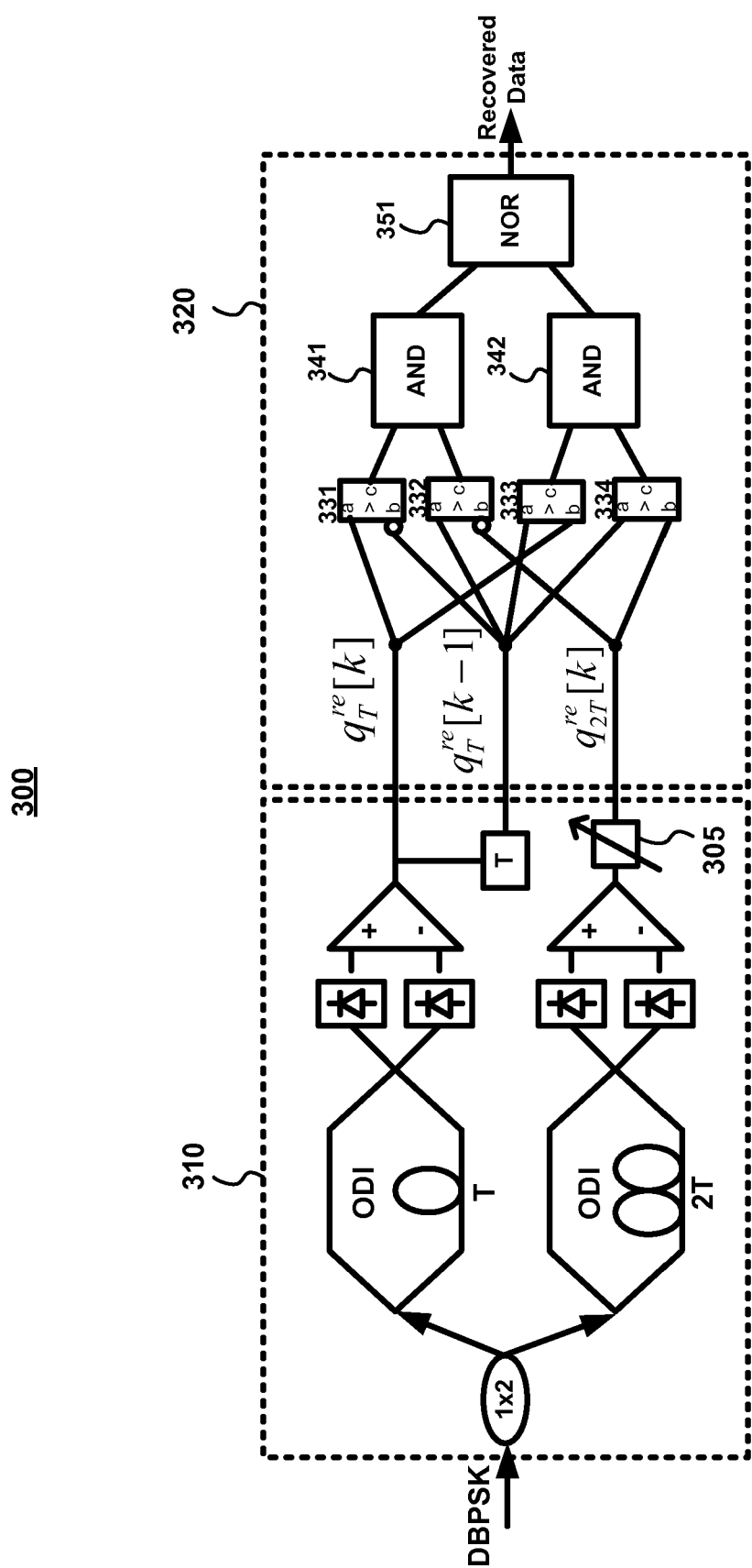
FIG. 3 is a schematic diagram of a further exemplary embodiment of a digital soft detection circuit for 3-chip DBPSK in accordance with the present invention.

A further exemplary embodiment of a soft detection circuit in accordance with the present invention is shown in FIG. 3. The circuit of FIG. 3 comprises a soft decision circuit 320 which decodes one bit at a time and can be implemented more simply than the above-described circuit 220. In the embodiment of FIG. 3, the three differentially detected signals output by the detection circuit 310 are coupled to an array of four pair-wise comparators 331-334, similar to those describe above. For each of the comparators 331 and 332, the second input (b) is inverted before it is compared to the first input (a).

As shown in FIG. 3, the first detected signal, $q_T[k]$, is coupled to the first input of comparator 331 and the second input of comparator 333; the second detected signal, $q_T[k-1]$, is coupled to the second, inverted, input of comparator 331, the first input of comparator 332, the first input of comparator 333, and the first input of comparator 334; and the third detected signal, $q_{2T}[k]$, is coupled to the second, inverted, input of comparator 332 and the second input of comparator 334.

Binary high values at the outputs of the comparators 331-334 are indicative, respectively, of the following conditions: $q_{00}>q_{11}$, $q_{00}>q_{10}$, $q_{01}>q_{10}$ and $q_{01}>q_{11}$, where the decision variables $q_{ij}$ are defined as described above.

The outputs of comparators 331 and 332 are AND'ed by AND gate 341, whereas the outputs of comparators 333 and 334 are AND'ed by AND gate 342. A logic high output at the gate 341 indicates that $q_{00}>\max(q_{10}, q_{11})$, whereas a high output at the gate 342 indicates that $q_{01}>\max(q_{10}, q_{11})$. The outputs of the AND gates 341 and 342 are NOR'ed by NOR gate 351 whose output is indicative of the most likely value of the bit of data that is currently detected. Because each data bit is decided on individually, there is no need for an interleaver.

The best guess (G) of a given DBPSK input bit can be expressed as:

$$G=\text{NOR}[\text{AND}(A>-B, B>-C), \text{AND}(B>A, B>C)], \quad (3a)$$

where $A=q_T[k]$, $B=q_T[k-1]$, and $C=q_{2T}[k]$.

In terms of the decision variables $q_{ij}$, the best guess (G) can be expressed as follows:

$$G=\text{NOR}[\text{AND}(q_{00}>q_{10}, q_{00}>q_{11}), \text{AND}(q_{01}>q_{10}, q_{01}>q_{11})]. \quad (3b)$$

In a further aspect of the present invention, provision is made for phenomena such as chromatic dispersion. Chromatic dispersion causes correlated phase distortion between adjacent bits in a DBPSK signal. The maximum likelihood detection laws embodied in Equations 1-3 are based on the assumption that such distortions are uncorrelated. Because the detected signal $q_{2T}[k]$ originates from a comparison between two nonadjacent bits in the input DBPSK signal, it will tend to be more contaminated than the other two signals by distortion due to chromatic dispersion. As shown in FIG. 3, a weighting factor application element 305 can be provided to modify the influence of the $q_{2T}[k]$ signal in the likelihood decision carried out by the soft decision circuit. To reduce the influence of the $q_{2T}[k]$ signal (to compensate for chromatic dispersion distortion, for example) the element 305 can be an attenuator (i.e., $0 \leq$ weighting factor $\leq 1$). The element 305 can be variable to allow the detection circuit to be optimized for different conditions. As an example, it is found that about 50% attenuation provides significantly improved performance for a 10-Gb/s DBPSK signal that is dispersed by a chromatic dispersion of about 1700 ps/nm.

Although the present invention has been illustrated with respect to 3-chip DBPSK, the present invention may be applied to other multiple-chip schemes including multiple-chip DPSK.

The various components of the exemplary embodiments shown, e.g. detectors, delays, comparators, gates, attenuator, etc. can be implemented in known ways and need not be described in greater detail. Furthermore, as is well-known, digital logic, such as that used by the present invention, can be implemented in a variety of equivalent ways, including combinatorial and sequential logic implementations. For example, the logic can be implemented with a microprocessor, given sufficient speed to handle the data rates involved.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A soft decision circuit for determining a most likely data content of a differential phase-shift keying (DPSK) modulated optical signal from three differentially detected intermediate signals that are based on comparisons between pairs of a series of three contiguous data bits of the DPSK modulated optical signal, the soft decision circuit comprising:
    a plurality of comparators, each comparator comparing two of the three intermediate signals and generating a digital signal in accordance with the comparison; and
    digital logic, the digital logic determining a most likely data content based on the comparator signals, wherein:

$$G=\text{NOR}[\text{AND}(B>-C, A>-B), \text{AND}(B>A, B>C)],$$

where A represents a first of the intermediate signals based on a comparison between the first and second of the series of three contiguous data bits, B represents a second of the intermediate signals based on a comparison between the second and third of the series of three contiguous data bits, C represents a third of the intermediate signals based on a comparison between the first and third of the series of three contiguous data bits, and G represents the most likely data content.

2. The soft decision circuit of claim 1, wherein the DPSK signal is a differential binary phase-shift keying (DBPSK) signal.

3. The soft decision circuit of claim 1, wherein the plurality of comparators includes four comparators and the digital logic includes two AND gates coupled to the four comparators and a NOR gate coupled to the two AND gates.

4. A soft detection circuit comprising the soft decision circuit of claim 1.

5. The soft detection circuit of claim 4 comprising:
    a three-chip DPSK detection circuit, wherein the three-chip DPSK detection circuit generates the three differentially detected intermediate signals.

6. The soft detection circuit of claim 5, wherein at least one of the three differentially detected intermediate signals is attenuated according to a weighting factor.

7. A soft decision circuit for determining a most likely data content of a differential phase-shift keying (DPSK) modulated optical signal from three differentially detected intermediate signals that are based on comparisons between pairs of a series of three contiguous data bits of the DPSK modulated optical signal, the soft decision circuit comprising:
    a plurality of comparators, each comparator comparing two of the three intermediate signals and generating a digital signal in accordance with the comparison; and
    digital logic, the digital logic determining a most likely data content based on the comparator signals, wherein the digital logic selects the largest of a plurality of decision variables $q_{ij}$, wherein;

$$q_{00}=A+B+C,$$

$$q_{01}=-A+B-C,$$

$$q_{10}=A-B-C,$$

$$q_{11}=-A-B+C,$$

where A represents a first of the intermediate signals based on a comparison between the first and second of the series of three contiguous data bits, B represents a second of the intermediate signals based on a comparison between the second and third of the series of three contiguous data bits, C represents a third of the intermediate signals based on a comparison between the first and third of the series of three contiguous data bits, and $q_{ij}$ represents the likelihood of a bit sequence ij.

8. The soft decision circuit of claim 7, wherein the DPSK signal is a differential binary phase-shift keying (DBPSK) signal.

9. A soft detection circuit comprising the soft decision circuit of claim 7.

10. The soft detection circuit of claim 9 comprising:
    a three-chip DPSK detection circuit, wherein the three-chip DPSK detection circuit generates the three differentially detected intermediate signals.

11. The soft detection circuit of claim 10, wherein at least one of the three differentially detected intermediate signals is attenuated according to a weighting factor.

12. A soft decision circuit for determining a most likely data content of a differential phase-shift keying (DPSK) modulated optical signal from three differentially detected intermediate signals that are based on comparisons between pairs of a series of three contiguous data bits of the DPSK modulated optical signal, the soft decision circuit comprising:
    a plurality of comparators, each comparator comparing two of the three intermediate signals and generating a digital signal in accordance with the comparison; and
    digital logic, the digital logic determining a most likely data content based on the comparator signals, wherein;

$G1 = \text{NOR}[\text{AND}(A > -B, B > -C), \text{AND}(B > A, B > C)],$ $G2 = \text{NOR}[\text{AND}(A > -B, A > -C), \text{AND}(\text{NOT}(B > A), A > C)],$ where A represents a first of the intermediate signals based on a comparison between the first and second of the series of three contiguous data bits, B represents a second of the intermediate signals based on a comparison between the second and third of the series of three contiguous data bits, C represents a third of the intermediate signals based on a comparison between the first and third of the series of three contiguous data bits, G1 represents a first bit of the most likely data content and G2 represents a second bit of the most likely data content.

13. A soft detection circuit comprising the soft decision circuit of claim 12.

14. The soft detection circuit of claim 13 comprising:
a three-chip differential phase-shift-keying (DPSK) detection circuit, wherein the three-chip DPSK detection circuit generates the three differentially detected intermediate signals.

15. The soft detection circuit of claim 14, wherein at least one of the three differentially detected intermediate signals is attenuated according to a weighting factor.

16. The soft decision circuit of claim 12, wherein the DPSK signal is a differential binary phase-shift keying (DBPSK) signal.

17. The soft decision circuit of claim 12, wherein the plurality of comparators includes six comparators and the digital logic includes four AND gates coupled to the six comparators, and two NOR gates coupled to the four AND gates.

18. The soft decision circuit of claim 17, comprising an interleaver coupled to the NOR gates.

19. A soft detection circuit comprising:
a three-chip differential phase-shift keying (DPSK) detection circuit, wherein the three-chip DPSK detection circuit generates a plurality of differentially detected intermediate signals based on comparisons between pairs of a series of three contiguous data bits of a DPSK modulated optical signal and wherein one of the three differentially detected intermediate signals is based on a comparison between the first and third of the series of three contiguous data bits and said one of the three differentially detected intermediate signals is attenuated according to a weighting factor; and
a soft decision circuit for determining a most likely data content of the DPSK modulated optical signal from the plurality of differentially detected intermediate signals, the soft decision circuit including:
a plurality of comparators, each comparator comparing two of the plurality of intermediate signals and generating a digital signal in accordance with the comparison; and
digital logic, the digital logic determining a most likely data content based on the comparator signals.

20. The soft detection circuit of claim 19, wherein the weighting factor is approximately 0.5.

21. The soft detection circuit of claim 19, wherein the DPSK signal is a differential binary phase-shift keying (DBPSK) signal.

* * * * *